(12) United States Patent
Fabijancic et al.

(10) Patent No.: US 11,003,668 B2
(45) Date of Patent: May 11, 2021

(54) PROGRAMMING LANGUAGE INDEPENDENT SOFTWARE TESTING ENVIRONMENT

(71) Applicant: SAP SE, Walldorf (DE)

(72) Inventors: Toni Fabijancic, Eppelheim (DE); Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 15/437,647

(22) Filed: Feb. 21, 2017

(65) Prior Publication Data

US 2018/0239802 A1 Aug. 23, 2018

(51) Int. Cl.
*G06F 16/2457* (2019.01)
*G06F 11/36* (2006.01)
*G06F 16/25* (2019.01)

(52) U.S. Cl.
CPC .... *G06F 16/24575* (2019.01); *G06F 11/3664* (2013.01); *G06F 16/25* (2019.01)

(58) Field of Classification Search
None
See application file for complete search history.

(56) References Cited

U.S. PATENT DOCUMENTS

| | | | | |
|---|---|---|---|---|
| 2006/0074914 A1* | 4/2006 | Kaiser | ............... | G06F 17/30536 |
| 2006/0130063 A1* | 6/2006 | Kilian | ..................... | G06F 9/505 |
| | | | | 718/100 |
| 2009/0164848 A1* | 6/2009 | Heidasch | ............ | G06F 11/3636 |
| | | | | 714/38.14 |
| 2012/0291014 A1* | 11/2012 | Shrinivasan | ........ | G06F 11/3664 |
| | | | | 717/124 |
| 2014/0122452 A1* | 5/2014 | Faerber | ............. | G06F 16/24561 |
| | | | | 707/693 |
| 2014/0201228 A1* | 7/2014 | Long | .................... | G06F 21/6227 |
| | | | | 707/759 |
| 2014/0280367 A1* | 9/2014 | Bloching | ............ | G06F 16/2282 |
| | | | | 707/803 |
| 2017/0017685 A1* | 1/2017 | Das | ..................... | G06F 16/2471 |

\* cited by examiner

*Primary Examiner* — Hau H Hoang

(74) *Attorney, Agent, or Firm* — Buckley, Maschoff & Talwalkar LLC

(57) ABSTRACT

Provided are systems and methods for programming language independent application development via test data stored in a database. In one example, the method includes receiving a database command from an application, the database command including a location and an access request for data at the location, determining if the application is operating in a test mode, and accessing data from a database based on the database command, wherein the accessing data comprises accessing test data stored in a test data storage based on the location included in the database command if the application is operating in the test mode, and accessing real data stored in a real data storage based on the location included in the database command if the application is not operating in test mode.

21 Claims, 6 Drawing Sheets

PROGRAMMING LANGUAGE INDEPENDENT SOFTWARE TESTING ENVIRONMENT

BACKGROUND

Software testing may evaluate an attribute or a capability of a software program or system and determine whether the software meets its required results. In general, testing attempts to ensure that the software meets the requirements that initiated its design and development, responds correctly to various possible kinds of inputs, performs its functions within an acceptable time, and can be installed and run within intended environments. In many situations, software testing still remains an art due to the complexity of software and the limited understanding of the principles of software. Discovering design defects in software is also difficult due to the complexity. In some cases, the number of possible tests for even simple software components can be practically infinite. Therefore, most software testing uses some strategy to select tests that are feasible to an amount of available time and resources. The testing typically attempts to execute a program or application with the intent of finding software bugs (e.g., errors or other defects). The task of testing is an iterative process because when one bug is fixed, it can illuminate other, deeper bugs, or even create new ones.

Test-driven development (TDD) is a software development process that relies on a very short and repetitive development cycle. In a typical test cycle, a developer writes an automated test case that defines a desired improvement or a new function to software, produces a small amount of code to pass the test, and refactors the code to acceptable standards. The overall development of the software is moved ahead incrementally one cycle of proven code at a time rather than adding larger amounts of code and testing at a later point in time. Test-driven development ensures a greater level of confidence in the code. During software development, a developer will often design an application that has versions written using different programming languages (e.g., for different operating environments) thus requiring testing to be performed for each specific language. However, access to test data is typically programming language dependent. As a result, the developer must create a test data container for every programming language being tested and also implement an access to a real persistency (e.g., a database table) and to a test-data container for each of the different programming languages.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
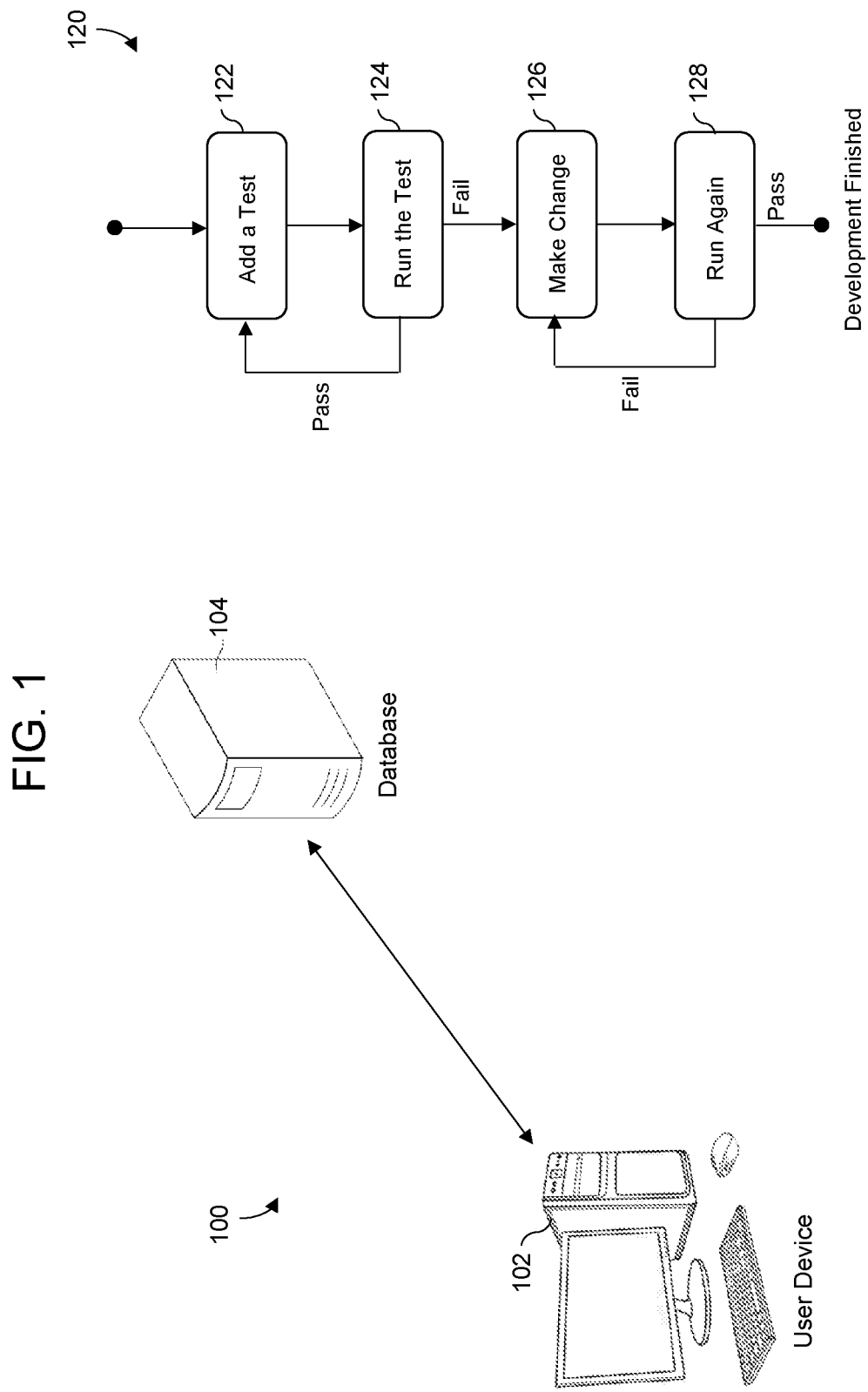
FIG. 1 is a diagram illustrating a system for testing software in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to software development in a testing environment that is programming language independent. Software testing is a critical phase of the software development process and can help to lower the support costs of development projects. Testing ensures that defects in the code are identified and corrected before implementation. One type of testing is referred to as test-driven development (TDD) which enables developers to take small steps when writing software. One of the drawbacks of TDD is the requirement that each programming language have its own test data container concept (and code accessing that test data container) in order to perform testing of an application written with that programming language. The example embodiments provide a system and method that can access either real data or test data for any programming language without having to implement different accesses to the data. In other words, applications written with different programming languages may access data (e.g., read and write) from the same test data container.

A developer may generate an application having different versions that are written using different programming languages. In this case, each programming language such as Java, C#, Advanced Business Application Programming (ABAP), and the like, may have their own benefits. When a software developer builds an application, the developer often develops the application in different languages for various purposes, for example, different devices, different operating environments, different displays, etc. However, each version of the application must be tested. The example embodiments describe a programming language independent test driven application development environment via a test data container of a database.

FIG. 1 illustrates a system 100 for testing software in accordance with an example embodiment. Referring to FIG. 1, the system 100 includes a user device 102 and a database 104 which are connected or coupled to each other, for example, via a direct connection, a network connection, and the like. Although not shown in FIG. 1, the user device 102 may be incorporated together with the database 104 in a single entity, however the two devices are shown separately for purposes of explanation. The user device 102 may be a computer, a workstation, a tablet, a laptop, a mobile device, a television, a gaming console, a server, and the like. The database 104 may be a relational database, a non-relational database, and/or the like. Also, in some examples, the database 104 may be incorporated within a cloud computing platform. The database 104 may store both real data and test data in separate containers, data stores, data blocks, and the like. The containers may store objects in an organized format that follows specific access rules. According to various embodiments, the test data container and the real data container may have the same structure/format.

As described herein, real data (e.g., production data or productive data) may refer to productive data or copies of productive data that are currently being used by an organization or other entity within a productive environment. A productive environment is a term that is used to describe the setting within a productive system in which software and other products are actually put into operation for their intended uses by end users. In contrast, test data is designed to test a computer program in a testing environment that typically includes a product that is still being used and operated on a theoretical basis. For example, test data may be used to verify that a particular input, provided to a particular function, produces an expected result. In some examples, test data may also be copies of production data. While test data is continually becoming more realistic, test data is not to be confused with live productive data and is typically isolated (e.g., physically or logically) from the productive data in order to allow for smooth and undisturbed operation of the productive environment without risk of damage from testing being done in a testing environment.

In an example, the user device 102 may corresponds to a developer of a software application or program that interacts with data stored on the database 104. For example, the developer may be associated with an organization that stores real data (e.g., live data) on the database 104. The real data may be accessible to the developer as well as other users associated with the organization such as employees, security, administrators, cloud computing service providers, and the like. In addition to the real data, the database 104 may also store test data. During software development, the developer may generate code and test the code using test data stored in a test container of the database 104. Process 120 shown in FIG. 1 illustrates an example of a developer adding and testing new segments of code.

In particular, process 120 illustrates an example of steps included in a test-first development (TFD) process which may be part of a TDD process that may also include refactoring. The first step 122 in the process 120 is to add a test that includes a segment of code or function to be tested. The test may often include just enough code to fail. In step 124, the test is run which may include a complete test suite although for sake of speed it may only include a subset, to ensure that the new test does in fact fail. If the test does not fail, the process 120 returns to adding a new test in 122. However, if the test does fail in 124, functional code may be updated to make it pass the new tests in 126. In 128 the test is run again on the updated code. This process 120 repeats until the updated code passes the test. Once the test passes the process 120 may be started over (a refactor may also be performed, for example, to improve readability, reduce complexity, remove redundancies, and the like).

According to various embodiments, the database 104 may determine whether to access the test data container or the real data container. The access may be determined based on an operating mode of an application or a user device that is requesting access to the database 104. For example, the database 104 may receive a database command from an application that is under development. The database command may include an SQL command, a noSQL command, or the like. The database command may specify a location and include a request for accessing or even changing data at the location (e.g., SELECT, UPDATE, DELETE, INSERT, etc.). That is, the database command may include a request to read data and/or a request to write data from the database 104. In response, the database 104 may determine if the application (or the device or user thereof) is operating in a test mode or a real mode, and access data from the database 104 based on the determined operating mode.

For example, the database 104 may access test data stored in the test data container based on the location included in the database command when the application is operating in the test mode, and access real data stored in the real data container based on the location included in the database command when the application is not operating in test mode. In either case, the same database command and location may be used to access the test container or the real container because the test container and the real container are contained as different persistencies within one and the same data base table, and include the same structure (or similar enough structure). Once the database 104 accesses the data based on the operating mode of the application, the application may be provided with the data from either the test container or the real container based on the determined mode.

The database 104 may use one or more indicators to determine whether an application is operating in test mode. For example, a flag or status may be used to identify the mode. In this case, a parameter may be evaluated by the database 104. There are different possibilities where this parameter may be set. For example, the parameter may be included in the consuming application. In this case, the parameter may be passed (i.e., communicated) from the application to the database 104 using an additional command at test start-up, for example. An advantage in this case is that the test mode could be switched on for one particular user or for a particular amount of time and/or execution date. As another example, a system parameter may be set, which is passed to the database 104. As another example, a library (e.g. DLL) may be provided which is implemented by the application developer. In this example, the library may contain numerous methods for switching the mode. As yet another example, the mode may be set directly on the database (e.g., by a data access manager of the database 104). An advantage here is that no parameter on application side is needed. This approach could be enhanced with additional customizing. There could be a mapping table, which sets the mode for particular tables and users/clients.

Figure 2:
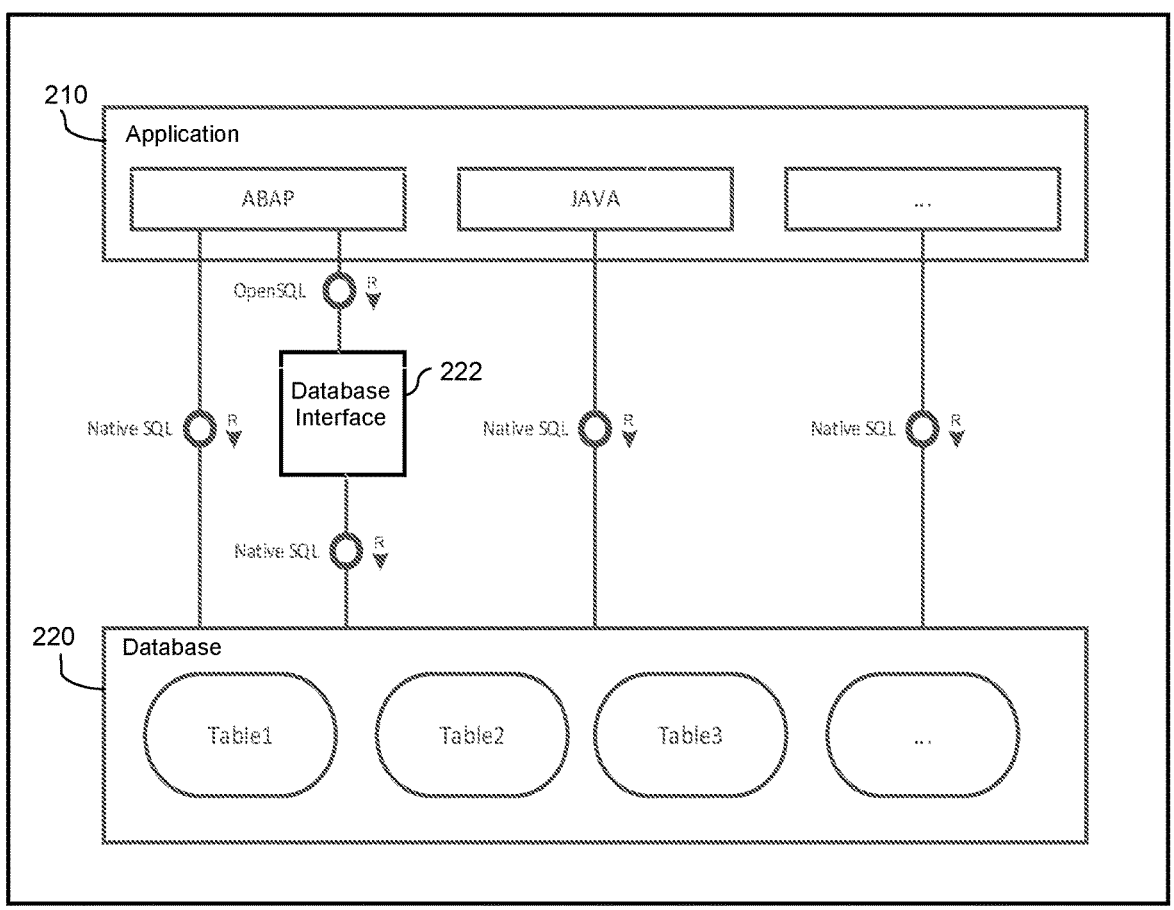
FIG. 2 is a diagram illustrating a process of accessing a database that is programming language dependent.

FIG. 2 illustrates a process 200 of accessing a database that is programming language dependent. In this example, an application 210 is being developed in different programming languages (i.e., clients) and each programming language has its own respective interface and method to access data from database 220. As a result, an application developer must implement a database access in ABAP, JAVA, and in any other programming language (i.e., version of the application), when accessing a specific table in the database 220 for purposes of testing. The types of commands used to access the database 220 may be different for each programming language. For example, ABAP may use an Open SQL command which is first transmitted to a database interface 222 and then routed to the database 220. Meanwhile, native SQL commands from the Java application are routed directly to the database 220. Accordingly, different methods for accessing the database during testing may be used by different clients of an application 210.

Figure 3:
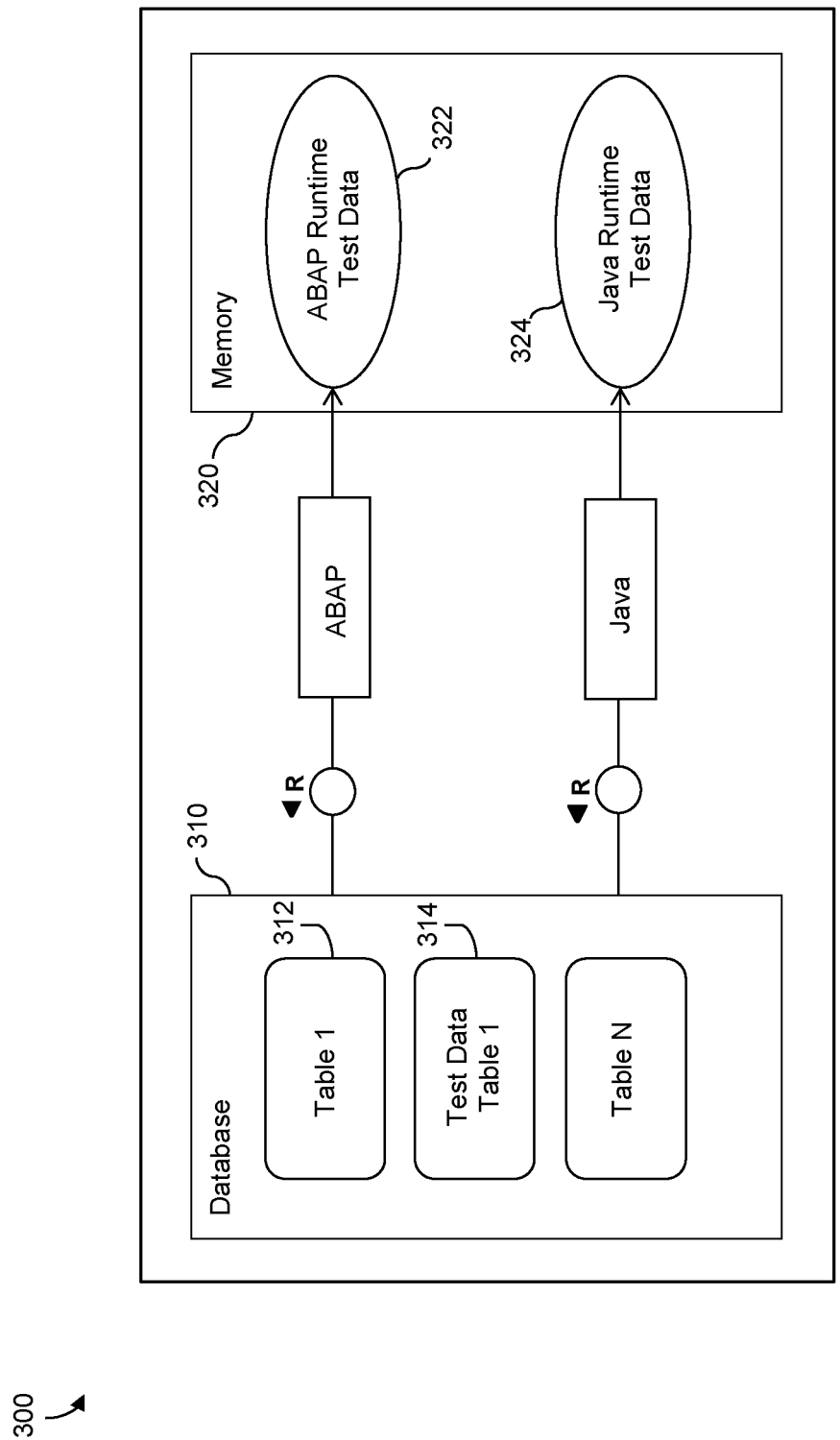
FIG. 3 is a diagram illustrating a programming language dependent test data environment for testing software.

FIG. 3 illustrates an example of a developer developing an application using the test driven development model. In this example, the developer has the requirement to develop two clients of the application, one in ABAP and one in JAVA using the same data set. The test environment 300 in FIG. 3 is programming language dependent. Accordingly, for each programming language, the developer implements a respective database access and also defines a test data container. FIG. 3 illustrates two different options to define a test data container. In a first option, a separate database table within a database 310 is used for the test data. In this example, Table 1 is real data container 312 and Test Data Table 1 is test data container table 314. In this scenario, each real application table has a separate test data container (TDC) table that requires a separate access path/method for each programming language. As another option, instead of having the test data in the database 310, a programming language dependent test-data container may be held in the memory 320 of the system during runtime of the application. In this case, the memory 320 includes an ABAP runtime test data environment 322 and a Java runtime test data environment 324. However, regardless of whether the test data is implemented within the database or the runtime environment, the developer needs to implement an access route to both the real and the test data for each respective programming language.

Figure 4:
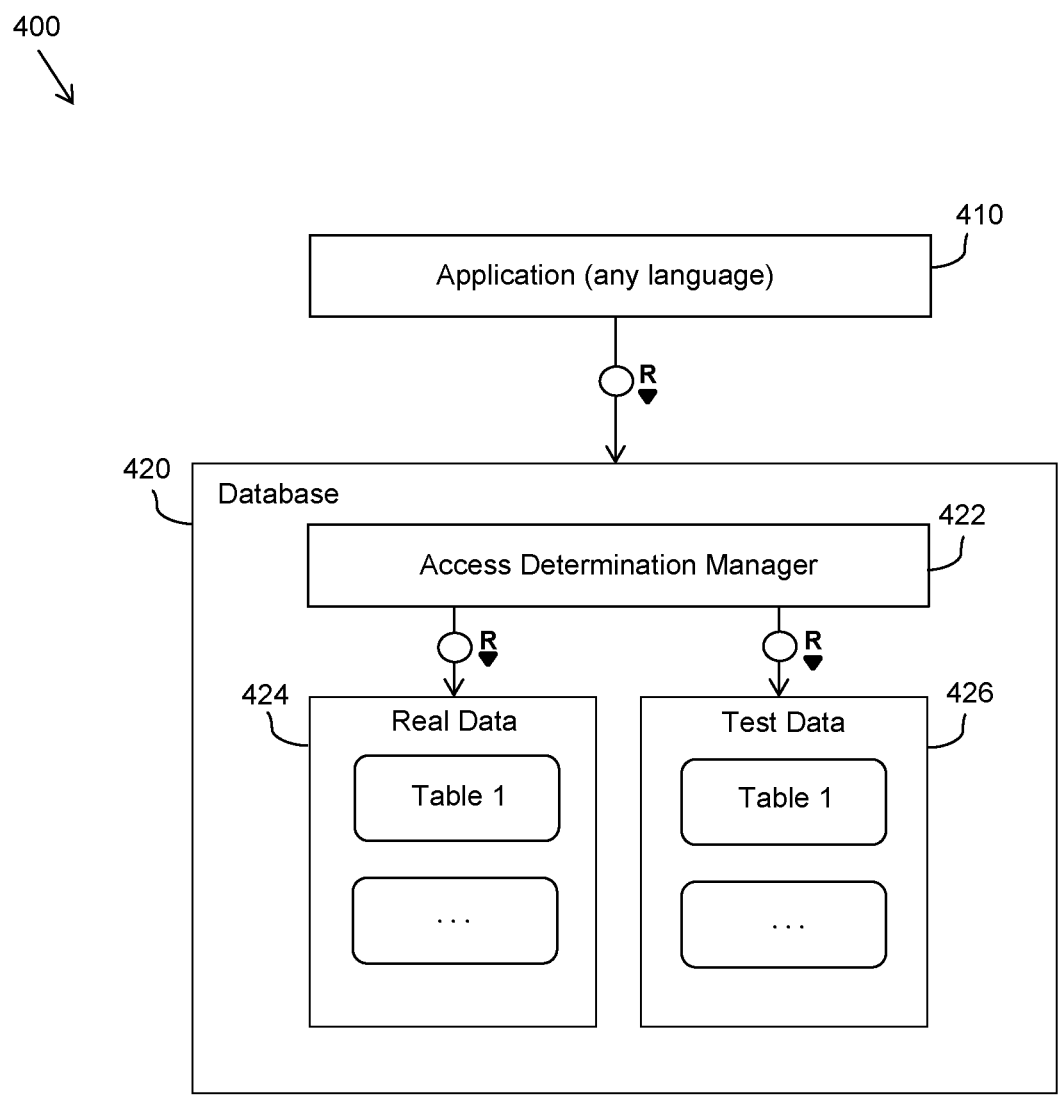
FIG. 4 is a diagram illustrating a programming language independent test data environment in accordance with an example embodiment.

FIG. 4 illustrates a programming language independent test data environment 400 in accordance with an example embodiment. The environment 400 includes an application 410 that accesses a database 420. Here, the application 410 may be stored within the database 420 or it may be stored external from the database 420, for example, by a user device, a server, a cloud platform, and/or the like that is connected to the database 420. In the example of FIG. 4, the database 420 may support programming language independent test-driven application development (TDD). The application may be written in any programming language, for example, Java, ABAP, C#, and the like, and may access the database 420 via the same method regardless of the programming language. In this example, the database 420 includes different storage containers including a real data persistency 424 (also referred to as a standard runtime environment) and a test data persistency 426 (also referred to as a testing runtime environment). The real data persistency 424 may store real data having a structure (e.g., table with rows, columns, etc.) and the test data persistency 426 may store test data having the same structure as the real data persistency 424. According to various embodiments, access to the real data persistency 424 and the test data persistency 426 may be managed or otherwise controlled by an access determination manger 422 that may be included within the database 420 or coupled to the database 420 via an external connection.

One of the differences between the database 420 in FIG. 4 and the two different options shown in FIG. 3, is that the database 420 has only one table (Table 1) that has two different persistencies (real data 424 and test data 426) for all programming languages. In contrast, in FIG. 3 there are separate tables for real data (Table 1) and test data (Table TDC 1) for each programming language. In the example of FIG. 4, for any consumer of the database 420, the access that is implemented may be the same regardless of whether accessing the real data or the test data. As a result, accessing the real data and the test data is transparent to the consumer and may be performed at a database level. Furthermore, separate tables do not need to be designed for each programming language. Instead, a database commands may be received from an application written in any programming language, processed by the access determination manager 422, and routed to the correct persistency based on the mode of the database 420. For example, the access determination manager 422 may include a chip, a circuit, logic, a processing device, a software module, and/or the like, that is implemented within or that is external to the database 420. In some examples, the access determination manager 422 may be controlled by a processing device of the database 420.

According to various embodiments, the database 420 may be set to operate in a runtime mode such as a test mode, real mode, and the like. For example, the mode may be set by an application passing a parameter to the database 420 or even directly to the access determination manager 422. As another example, the mode may be set automatically based on a device or a user of the application. As another example, the mode may be set the application calling a function of a library, and the like. The access determination manger 422 routes access requests (e.g., database commands) to the database 420 based on the mode. For example, if the database 420 is set to a "test mode," the access determination manager 422 may route the access request to the test data persistency 426. As another example, if the database 420 is set to "real mode" the access determination manager 422 may route the access request to the real data persistency 424. The request may include an SQL command, a noSQL command, or the like. The request may include a specific location such as at least one table identifier, at least one row, at least one column, and the like.

According to various embodiments, the test data persistency 426 may have the same structure/format as the real data persistency 424. Therefore, the location included in the database command may be used to access both the real data persistency 424 and the test data persistency 426 because the structures are the same. One of the benefits provided by the example embodiments is that there isn't a need to implement separate coding to access the test data because the switch between the real data and the test data is happening on a database level. For example, there is no need to introduce a proxy, etc. This also means that the overlying programming language is irrelevant. In other words, the developer does not need to concern themselves with a mode that the database is operating in because the database determines whether to access the real data or the test data. As a non-limiting example, the application (or the code included therein) may include a SQL Select command that also identifies a table and one or more columns of the table. The access determination manger 422 may access either the real data persistency 424 or the test data persistency 426 using the same table identifier and same columns identified by the SQL Select command.

Figure 5:
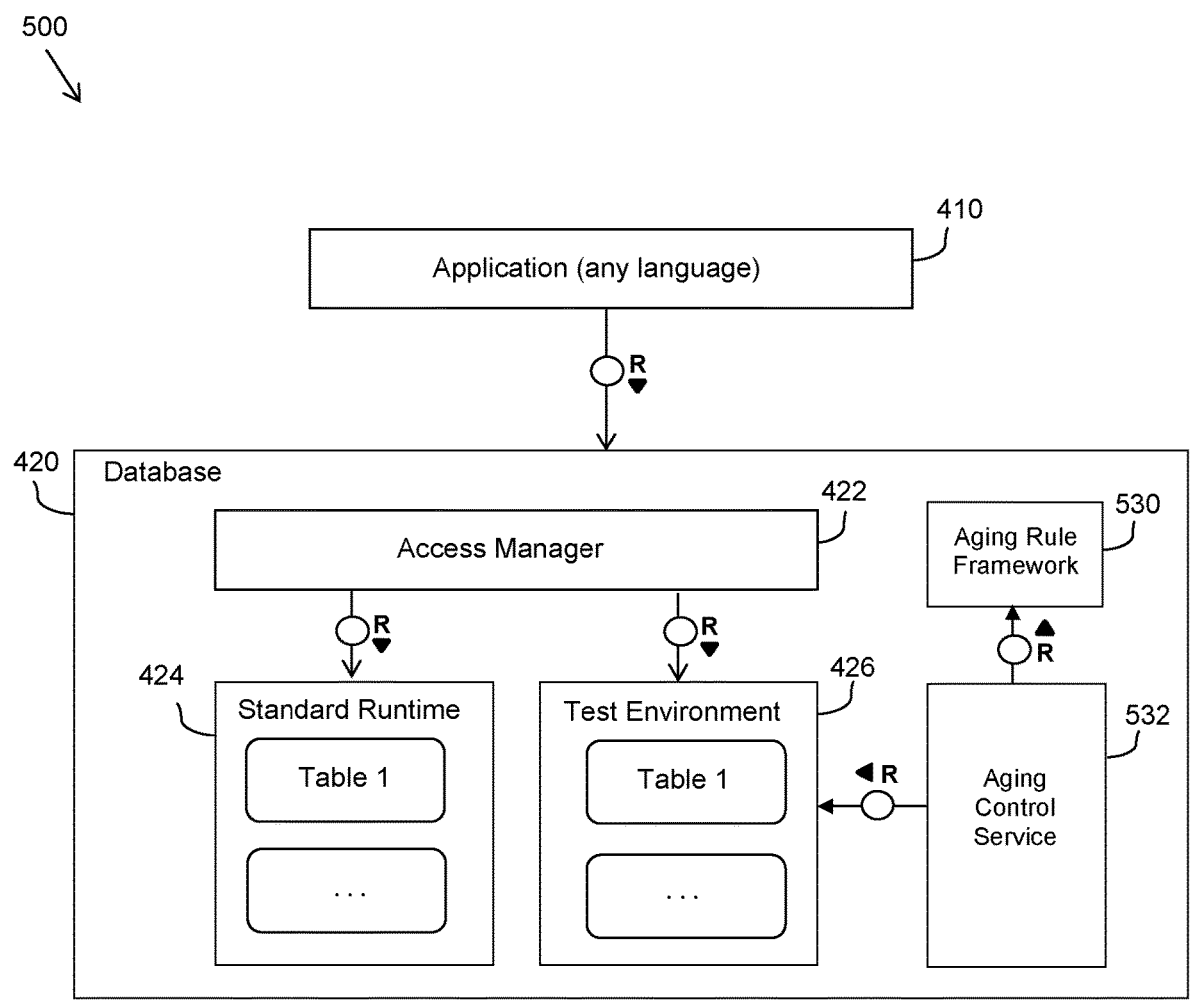
FIG. 5 is a diagram illustrating a programming language independent test data environment in accordance with another example embodiment.

FIG. 5 illustrates a programming language independent test data environment 500 in accordance with another example embodiment. The environment 500 of FIG. 5 includes the same components as the environment 400 of FIG. 4, with the addition of a data aging rule framework 530 and an aging control service 532. In this example, data aging may be taken into consideration because there situations in which test data is time dependent (e.g., situations in which there are time dependent calculations in which the test data needs to fit an actual system date, or the like.) The data aging rule framework allows the test data to age. The user or administrator can maintain the rules for aging the test data in an aging rule framework 530 and the aging control service 532 may manage the age of data stored in the test data persistency 426. For example, the aging concept offers new possibilities to create a valid test easily because there is no need to create a particular logic for dynamically creating time dependent data for a particular client/programming language. Instead, the aging is performed by the aging control service 532 in combination with the aging rule framework 530.

Figure 6:
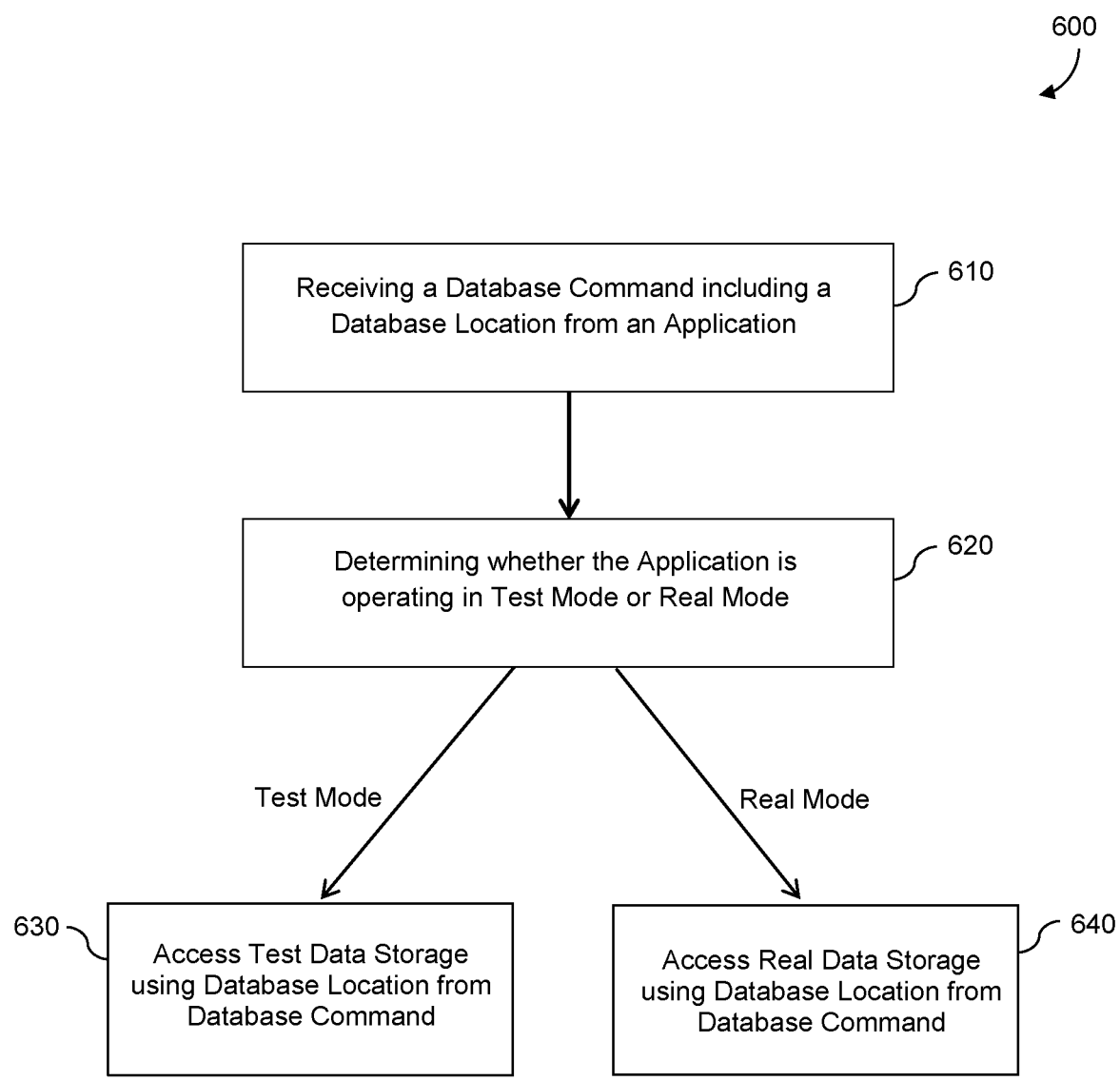
FIG. 6 is a diagram illustrating a method for testing software in accordance with an example embodiment.

FIG. 6 illustrates a method 600 for testing software in accordance with an example embodiment. The method 600 may be performed by a database such as shown in FIG. 1, an access determination manager included in a database as shown in FIGS. 4 and 5, or another device. Referring to FIG. 6, in 610, the method includes receiving a database command from an application. The database command may be an SQL command, a noSQL command, or the like, and may include one or more database locations along with a type of access request for data at the location. Examples of the type of access request include SELECT, DELETE, INSERT, and the like. In 620, the method determines a runtime operating mode of the database. For example, the operating mode may include a test mode, a real mode, or the like. In response to determining the database is operating in the test runtime mode in 620, in 630 the method includes accessing test data stored in a test data storage of the database based on the location included in the database command. As another example, in response to determining the database is operating in the real runtime mode in 620, the accessing may include accessing real data stored in a real data storage of the database based on the location included in the database command.

In the examples herein, the test data storage may have a structure that mirrors a structure of the real data storage. Accordingly, the location included in the database command may be an accessible location in both the test data storage and the real data storage. For example, the location may include a table identifier and at least one of a row and column identifier. Because the determination to access the real data and the test data is performed at the database level, the test data storage is programming language independent and is accessible by an application having clients in different programming languages such as Java, ABAP, C#, and the like.

In some embodiments, the determining in 620 may include determining that the application is operating in the test mode based on a parameter that is transferred from the application to the database. For example, the parameter may include a flag or a bit that is set by the application based on a predetermined rule. As another example, the determining in 620 may include determining that the application is operating in the test mode based on at least one of a user associated with the application and a system associated with the application. For example, a user ID (e.g., device ID, email address, login name, security credential, etc.) may identify a user or a device and be used to set the mode of the database. As another example, the determining in 620 may include determining that the application is operating in the test mode based on a table included in the location of the database command. As another example, the determining in 620 may be determined based on a library call made by the application.

The example embodiments are directed towards a software development environment in which access to a test data container is programming language independent. A database may include a real persistency storing real data and a test persistency storing test data. Access to the database may be controlled by an access determination manager that is coupled to the database or implemented within the database. The access determination manager may receive a database command from an application, for example, a SQL command, a noSQL command, and the like, which includes a database location such as a table identifier, a column, a row, etc. The access determination manager may determine if the application is operating in a test mode or a real mode. The access determination manager can access the test storage or the real storage based on the determined mode. The same database command may be used to access both the test data storage and the real data storage. For example, a structure of the test data storage may be the same as the real data storage. Accordingly, a developer only needs to develop one code for accessing the database and the system determines whether to access the real data or the test data based on the determined mode of the application.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a database comprising hardware that includes a test data storage and a real data storage; and
an access determination manager implemented within the database, the access determination manager configured to:
receive a database command from an application written in a first programming language, the database command comprising a table identifier that identifies a name of a first table that is routable within the real data storage and identifies a name of a second table that is routable within the test data storage and which shares a same name as the first table,
determine that the application written in the first programming language is operating in a test mode,
route an access request to the second table in the test data storage based on the table identifier in the database command,
receive a second database command from an application written in a second programming language that is different than the first programming language, where the second database command comprises the table identifier,
determine that the application written in the second programming language is operating in the test mode, and
route a second access request to the second table in the test data storage based on the table identifier.

2. The computing system of claim 1, wherein the test data storage comprises table names that mirror table names of the real data storage, and the table identifier included in the database command corresponds to a table name that is accessible in both the test data storage and the real data storage.

3. The computing system of claim 1, wherein the database command further comprises at least one of a row and column identifier.

4. The computing system of claim 1, wherein the database comprises a programming language independent database in which the second table in the test data storage is accessible by an SQL command from applications written in different programming languages.

5. The computing system of claim 4, wherein the second table in the test data storage is accessible by an application that is written in Java and an application that is written in Advanced Business Application Programming (ABAP).

6. The computing system of claim 1, wherein the access determination manager is configured to determine that the database is operating in the test mode based on a parameter that is transferred from the application written in the first programming language to the database.

7. The computing system of claim 1, wherein the access determination manager is configured to determine that the database is operating in the test mode based on at least one of a user associated with the application written in the first programming language and a system associated with the application written in the first programming language.

8. The computing system of claim 1, wherein the access determination manager is configured to determine that the application written in the first programming language is operating in the test mode based on a table included in the location of the database command.

9. The computing system of claim 1, wherein the database comprises a table corresponding to the table identifier, and the table includes a real data persistency and a test data persistency that mirrors the real data persistency.

10. A method comprising:
receiving, via at least one of a circuit and a logic implemented within a database, a database command from an application written in a first programming language, the database command comprising a table identifier that identifies a name of a first table that is routable within a real data storage and identifies a name of a second table that is routable within a test data storage and which shares a same name as the first table;
determining that the application written in the first programming language is operating in a test mode;
routing an access request to the second table in the test data storage based on the table identifier in the database command,
receiving a second database command from an application written in a second programming language that is different than the first programming language, where the second database command comprises the table identifier,
determining that the application written in the second programming language is operating in the test mode, and
routing a second access request to the second table in the test data storage based on the table identifier.

11. The method of claim 10, wherein the test data storage comprises table names that mirror table names of the real data storage, and the table identifier included in the database command corresponds to a table name that is accessible in both the test data storage and the real data storage.

12. The method of claim 10, wherein the database command further comprises at least one of a row and column identifier.

13. The method of claim 10, wherein the database comprises a programming language independent database in which the second table in the test data storage is accessible by an SQL command from applications written in different than the first programming languages.

14. The method of claim 13, wherein the second table in the test data storage is accessible by an application that is written in Java and an application that is written in Advanced Business Application Programming (ABAP).

15. The method of claim 10, wherein the determining comprises determining that the database is operating in the test mode based on a parameter that is transferred from the application written in the first programming language to the database.

16. The method of claim 10, wherein the determining comprises determining that the database is operating in the test mode based on at least one of a user associated with the application written in the first programming language and a system associated with the application written in the first programming language.

17. The method of claim 10, wherein the determining comprises determining that the application written in the first programming language is operating in the test mode based on a table included in the location of the database command.

18. A non-transitory computer readable medium having instructions that when executed cause a computer to perform a method comprising:
receiving, via at least one of a circuit and a logic implemented within a database, a database command from an application written in the first programming language, the database command comprising a table identifier that identifies a name of a first table that is routable within a real data storage and identifies a name of a second table that is routable within a test data storage and which shares a same name as the first table;

determining that the application written in the first programming language is operating in a test mode; and routing an access request the second table in the test data storage based on the table identifier in the database command, receiving a second database command from an application written in a second programming language that is different than the first programming language, where the second database command comprises the table identifier, determining that the application written in the second programming language is operating in the test mode, and routing a second access request to the second table in the test data storage based on the table identifier.

19. The non-transitory computer-readable medium of claim 18, wherein the test data storage comprises table names that mirror table names of the real data storage, and the table identifier included in the database command corresponds to a table name that is accessible in both the test data storage and the real data storage.

20. The non-transitory computer-readable medium of claim 18, wherein the database command further comprises at least one of a row and column identifier.

21. The non-transitory computer-readable medium of claim 18, wherein the test data storage comprises a programming language independent test database in which the second table in the test data storage is accessible by an SQL command from applications written in different programming languages.

* * * * *